United States Patent [19]
Bell et al.

[11] Patent Number: 4,608,895
[45] Date of Patent: Sep. 2, 1986

[54] ROTARY DIE CUTTING

[75] Inventors: Jerry L. Bell, Pontiac; John D. Douma, Royal Oak; David P. Keinath, Ortonville; Robert E. Moore, Auburn Hills, all of Mich.

[73] Assignee: Bernal Rotary Systems, Inc., Troy, Mich.

[21] Appl. No.: 589,505

[22] Filed: Mar. 14, 1984

[51] Int. Cl.$^4$ .................. B31B 1/14; B26D 1/62
[52] U.S. Cl. .................. 83/345; 83/343; 83/663; 493/60; 493/64; 493/370; 76/107 R
[58] Field of Search .......... 83/345, 343, 663, 344, 83/366; 493/60, 64, 370; 76/107

[56] References Cited

U.S. PATENT DOCUMENTS

| | | | |
|---|---|---|---|
| 3,283,635 | 11/1966 | Johnson | 83/345 |
| 3,528,333 | 9/1970 | Hornmung | 83/345 |
| 3,578,761 | 5/1971 | Sarka | 83/343 |
| 3,895,549 | 7/1975 | Noda | 83/345 |
| 3,905,283 | 9/1975 | Baker | 493/60 X |
| 3,981,213 | 9/1976 | Lopman | 493/60 X |
| 4,393,738 | 7/1983 | Heyden | 83/663 |
| 4,493,235 | 1/1985 | Martin | 83/345 |

Primary Examiner—Donald R. Schran
Attorney, Agent, or Firm—Barnes, Kisselle, Raisch, Choate, Whittemore & Hulbert

[57] ABSTRACT

A pair of rotary dies with lands having coacting cutting edges which cut blanks of material from a web passing between the rotating dies. To provide a clean cut and improved squareness of the cut ends, a side face of the land adjacent the cutting edge has a positive rake. To insure that the cutting edges can be brought into coacting relationship to produce a clean cut, they are located and arranged on the dies so that they can be varied and adjusted axially and in rotary phase relationship to each other. A die stand for positioning, adjusting and driving the rotary dies, and a method for making negative electrode cylinders for producing the rotary dies by hardening, grinding and electric discharge machining blank cylinders of tool steel, are also disclosed.

32 Claims, 33 Drawing Figures

ROTARY DIE CUTTING

BACKGROUND

This invention relates to rotary die cutting of blanks from thin sheets or webs of material such as paper, paper board, cardboard, plastic film, metal foil, sheet metal and the like. More particularly, this invention relates to improved dies for rotary cutting, die stands for supporting, aligning and driving rotary dies, methods of making rotary dies and methods of rotary die cutting.

One previously known way of rotary cutting is to pass a web of material between a pair of superimposed rotating metal cylinders with one cylinder having a plain cylindrical surface acting as an anvil for cutting elements carried by the other cylinder. The cutting elements projection generally radially outward from the body of the cylinder and have a sharp knife edge with a V shaped cross section. A method and apparatus for producing the V shaped cutting elements as a homogenously integral part of the metal cylinder is disclosed in U.S. Pat. Nos. 3,550,479 and 3,796,851.

U.S. Pat. No. 3,142,233 discloses a way of cutting paper and paper board by passing it between a pair of superimposed rotating dies each of which carries complimentary cutting elements which coact to sever the paper or paper board. The complimentary cutting elements are formed as an integral part of thin and flexible flat metal plates which are wrapped around cylinders and secured thereto by an adhesive or double faced tape. The cutting elements are formed by applying to the plates photocomposed images of the cutting elements in the form of an acid resist and then chemically etching away portions of the remaining surface of the plates so that the cutting elements stand out in shallow relief of about 0.005 to 0.035 of an inch. This chemical etching produces cutting elements having a negative rake.

While these rotary dies are able to cut very thin low density materials such as paper or paper board, they do have a number of significant problems and are unsatisfactory for cutting significantly thicker and higher density materials. In use, it is very difficult to obtain satisfactory registration of the rotating cutting elements so that they will coact to cut the material. Moreover, even when satisfactory registration is initially obtained, in use the thin plates stretch to such an extent that further adjustments must be made while in use and eventually they stretch so much they cannot be registered and hence, produce unsatisfactory cuts and must be scrapped. The plates stretch under the forces created by the cutting action because they must be very thin and soft to enable them to be wrapped around the cylinders.

Furthermore, in use the cutting elements wear or become dull and hence, have a relatively short useful life. They cannot be hardened to increase their useful life because hardened metal plates could not be wrapped around the cylinders. Also, when the cutting elements become dull, due to their shallow relief and negative rake they cannot be resharpened and hence, the metal plates must be discarded. Also because of the negative rake, the cutting elements do not cleanly cut the sheet material, the cut edges are not square, and the cut blanks tend to hang up or catch in the dies and are difficult to strip from the dies.

SUMMARY

Pursuant to this invention, a web of material is cut along a predetermined line of severance by a pair of superimposed die cylinders having coacting severing elements in the form of lands projecting generally radially outward from the main body of the cylinders. The lands have an outer face and a pair of spaced apart side faces. To provide a clean cut, improved tool life, and decrease the tendency of the cut blanks to catch in the dies, the side face of each land which defines a cutting edge in conjunction with the outer face has a positive rake or is inclined at an obtuse included angle to the outer face. Preferably both side faces of each land have a positive rake. To enable adjustment of the relative position of the lands on one die with respect to the other die so that proper registration of the lands can be obtained for coacting to cut the web, the lands are constructed and arranged on the dies so that registration can be established by moving the die cylinders axially and/or in rotary phase relationship with respect to each other.

To permit this adjustment where the line of severance subtends more than a quadrant, the cutting action transfers from one edge to the other of the lands at a pair of coacting crossover sections in the lands. To permit this adjustment where the line of severance defines a closed figure, the cutting action of the lands transfers from one edge to the other at least twice in two generally opposed pairs of crossover sections in the coacting lands. To provide a clean cut and prevent crushing of the web in the area where the cuttng edges transfer from one side to the other of the lands, in each crossover section the outer face of the land is narrowed and a portion of one side face is relieved.

To facilitate set up and adjustment of the cylindrical dies, they are preferably journaled for rotation in a die stand which permits the die cylinders to be shifted both axially and in rotational phase with respect to each other. Preferably, the die stand also enables adjustment of the amount of clearance between the die cylinders and skewing of the axes of rotation of one die cylinder with respect to the other.

To greatly improve the accuracy of the location of the lands on the die cylinders with respect to each other, registration of the coacting cutting edges, useful tool life, and to facilitate forming the desired geometry of the lands, they are machined in hardened tool steel cylinders by electrical discharge machining. In electrical discharge machining, a negative electrode with a generally flat outer face can be used but a cylindrical electrode is preferred. Preferably, the die cylinder blanks are ground to the desired outside diameter and with the desired surface finish for the outer face of the lands before electric discharge machining. Preferably, the electric discharge machining forms the lands on the cylinders essentially without any electric discharge machining of the outer face of the lands. Thus, preferably the outisde diameter and surface finish of the outer face of the lands is produced by the grinding of the cylinders.

Preferably, the negative electrode is made by first machining with a rotating cutting tool a V shaped groove in an electrode blank in the pattern or configuration of the predetermined desired line of severance. The V shaped groove has a minimum radial depth at least slightly greater than the maximum radial extent or height of the land to be machined. To produce the desired width of the outer face of the land, portions of the groove are relieved with a rotating cutting tool to a radial depth greater than the radial height of the land to be machined. At any given point along the longitude of the groove this relief is cut into only the one of the two side faces of the groove which is distal from the desired cutting edge of the land to be produced. Since the radial depth of both the groove and the relief exceeds the desired radial height of the land, the electric discharge machining of the side faces of the land is accomplished without machining the outer face of the land.

Preferably the cylindrical dies are solid cylinders although they may be hollow cylinders, circumferentially continuous sleeves mounted on mandrels or even arcuate segments fixed to a carrier cylinder or sleeve, and the like which provides a right circular cylindrical outer face of the lands.

Objects, features and advantages of this invention are to provide a pair of rotary die cylinders which cleanly cut a web of material, provide improved appearance and squareness of the cut edge, have greatly improved tool life, have cutting edges which tend to sharpen themselves as they wear, can be readily and easily adjusted for proper registration or coaction of their cutting edges, will readily cut relatively dense and thick webs of material and webs having a relatively high shear strength, are dimensionally stable and do not experience changes in registration of the coacting cutting edges when in use, do not require periodic adjustment in use to keep the cutting edges in coacting relation, decrease the tendency for the cut blanks to hang up in the dies, can be produced in hardened tool steel by electrical discharge machining, can be economically manufactured and are rugged and durable.

Additional objects, features and advantages of this invention are to provide a method of electrical discharge machining and of making electrodes for electrical discharge machining of rotary dies which are extremely accurate, simple, economical and utilize conventional conical rotary cutting tools to make the electrode; and to provide a die stand for mounting and driving rotary dies which readily, easily and reliably varies and adjusts the axial and rotary phase relationship of the cutting dies and the skewing of the axes of and clearance between the rotary dies, is rugged, durable, of economical manufacture and assembly and requires little service and maintenance.

BRIEF DESCRIPTION OF THE DRAWINGS

These and other objects, features and advantages of this invention will be apparent from the following detailed description, append claims, and accompanying drawings in which:

DETAILED DESCRIPTION

Figures 1, 2:
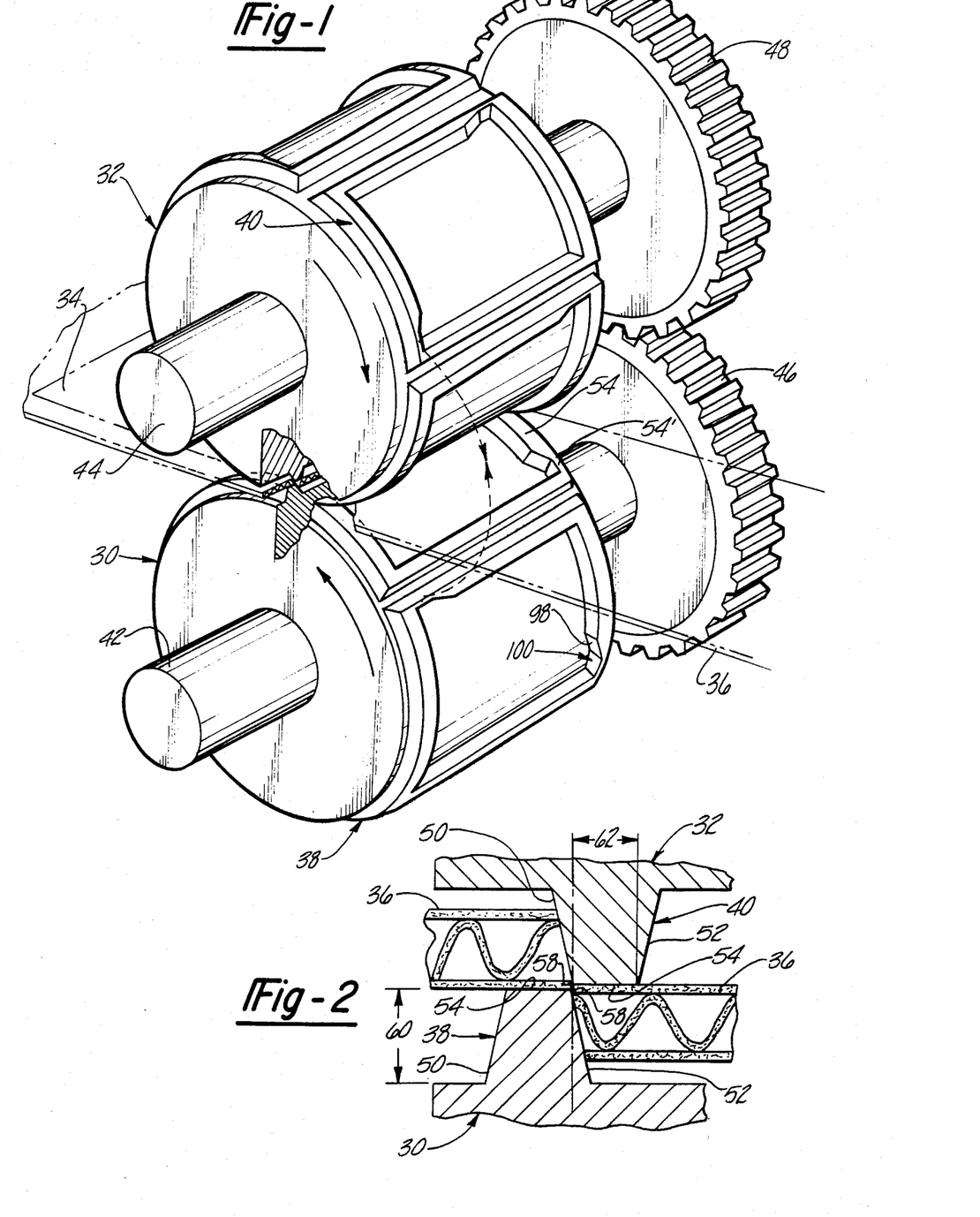
FIG. 1 is a perspective view of rotary dies embodying this invention.
FIG. 2 is an enlarged fragmentary view of the broken out section of FIG. 1.

Referring in more detail to the drawings, FIG. 1 is a perspective view illustrating a pair of rotary die cylinders 30 and 32 of this invention cutting a rectangular article or blank 34 from a web 36 of material passing between the dies. The material is cut by edges of a pair of coacting lands 38 and 40 of the dies. Preferably the die cylinders have a plurality of pairs of coacting lands 38 and 40 which are equally circumferentially spaced on the main body of the dies. The dies are journaled for rotation by shafts 42 and 44 which preferably are integral. The dies are corotated in opposite directions of rotation at the same speed by a pair of meshed gears 46 and 48 each coupled to one of the shafts of the dies.

In accordance with one feature of this invention, to provide rugged and durable cutting edges with a long useful life and which can be easily resharpened, the lands are formed as shown in FIGS. 1 and 2 with side faces 50 and 52 each inclined at an obtuse angle to the outer face 54 of the lands. One of the side faces in conjunction with the outer face of each land defines coacting cutting edges 58 on the lands for severing or shearing the web. This obtuse inclination of the side face associated with the cutting edge also provides a clean cutting or shearing action and results in smoother cut edges of the material which are more nearly square.

Furthermore, this obtuse inclination on the side face tends to make the cutting edges 58 self sharpening because as the outer face 54 wears away in use, it still defines with the side face a chisellike sharp edge. This also decreases the tendency of the cut blanks to hang up in the dies and tends to eject the cut blanks. Preferably each side face is inclined to its associated outer face at an obtuse included angle which is usually in the range of about 100° to 120° and preferably about 105° to 110°. If both faces 50 and 52 of each land are inclined the same number of degrees to their associated outer face, they will be inclined to each other at an acute included angle in the range of about 20° to 60° and preferable about 30° to 40°.

To provide a cleaner cut and increase the strength and durability of the lands, their outer faces 54 are of substantial transverse width. These relatively wide outer faces 54 in conjunction with the obtusely inclined side faces and their arcuate path of travel tend to compress the material of the web while it is being severed and to force the cut ends into and wipe them across the side faces of the land all of which tends to provide a much cleaner cut and smoother squarer cut ends. To provide clearance for the cut web and permit resharpening of the cutting edges 58, the lands 38 and 40 project generally radially outward from the main body of the die a radial distance which preferably exceeds the thickness of the web 36 sufficiently to permit the cutting edges to be resharpened several times by cylindrically grinding the die. Usually the transverse width 62 of the outer face 54 of each land is in the range of about 0.010 to 0.125 of an inch, typically about 0.020 to 0.060 of an inch, and preferably 0.030 to 0.040 of an inch. Usually the radial extent 60 of the lands is about 0.050 to 0.125 of an inch and preferably about 0.060 to 0.080 of an inch.

To produce a clean cut in materials of differing density, compression strength, thickness, and/or shear strength, it is necessary to vary the position of the coacting cutting edges 58 of the lands relative to each other. With some materials, the cutting edges 58 need to be slightly overlapped (negative clearance) to provide a clean cut while with the other materials, the edges need to be aligned as shown in FIG. 2 (zero clearance) or even displaced so that there is a gap between the edges (positive clearance). Generally the distance between the cutting edges increases with increasing thickness, density, compression strength and shear strength. Usually this clearance is in the range of about −0.020 to +0.100 of an inch, frequently −0.010 to +0.050 of an inch, and often −0.005 to +0.010 of an inch. Furthermore, the generally radial clearance between the cutting edges 58 usually varies from about 0.0000 to about 0.100 of an inch and often from about 0.002 to 0.050 of an inch. Frequently, although not necessarily, the dies are designed on the assumption that they will operate with a nominal clearance of the cutting edges 58 of about −0.002 of an inch.

In accordance with this invention, the dies are constructed and arranged so that in use the position of the cutting edges 58 relative to each other can be varied and adjusted to provide a coacting working relationship which produces a clean cut. This adjustment also permits the dies to be adjusted in use to compensate for tolerances, variations and inaccuracies in manufacture of the dies. The lands are constructed, arranged and located on the dies so that their cutting edges can be brought into registration or coacting cutting relationship by moving the dies axially and/or in rotary phase with respect to each other. This is accomplished by locating various portions of the land and the cutting edge portions thereof on each die so that relative movement of the dies in one axial direction and/or rotary phase direction causes the coacting cutting edge portions of both dies to move toward and even overlap each other and movement in the opposite direction causes the cutting edge portions of both dies to move away from and even be spaced from each other. If the predetermined severance line to be cut by the dies subtends more than one quadrant, it is necessary to locate a cutting edge portion on opposite sides of each land along differing longitudinal portions of the land.

For a predetermined desired severance line the appropriate location of each land and all cutting edge portions can be determined in the three steps of (1) making a development of the land of one die in relation to the predetermined desired line of severance and movement of such land along the axis and transverse rotary phase line of its associated die, (2) adding an overlay of the development of the land of the other die in relation to such desired line of severance and movement of such land along the axis and transverse phase line of its associated die, and (3) selecting as the coacting cutting edge portions the edge portions of each land immediately adjacent such desired line of severance.

Figure 3:
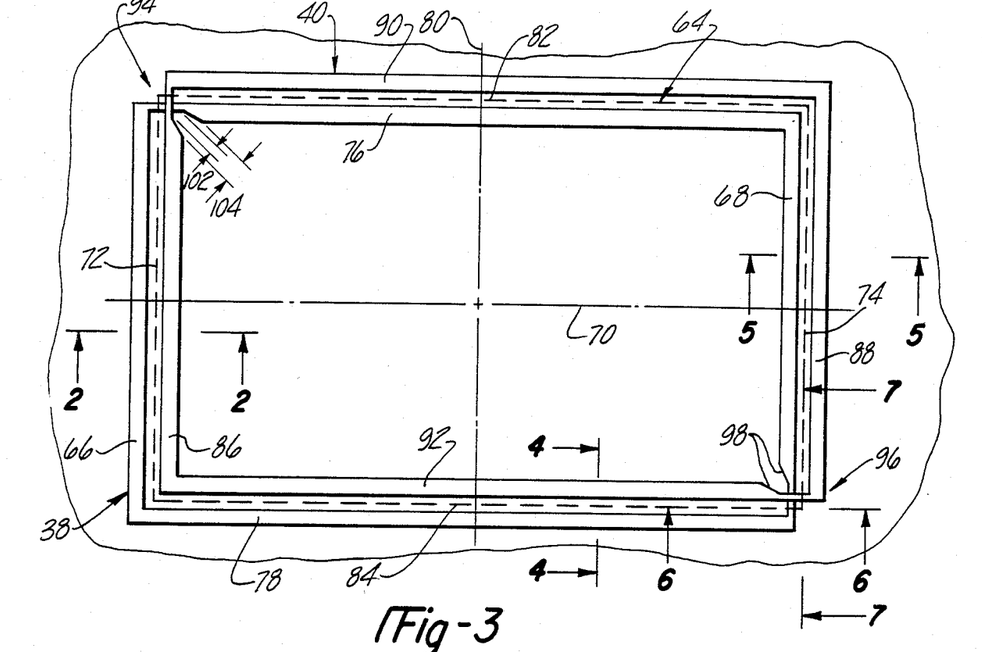
FIG. 3 is an enlarged development and overlay of one pair of lands of the die cylinders of FIG. 1.

For example, FIG. 3 shows a development and layout of the lands 38 and 40 of the dies 30 and 32 for cutting along a severance line 64 of a rectangle. The portions 66 and 68 of the land 38 which extend generally transverse to the axis 70 are located adjacent and on the same side of the segments 72 and 74 of the severance line so that when their associated die 30 moves axially to the right (as viewed in FIGS. 1 & 3) they move toward these severance lines segments and when the die moves axially to the left they move away from these severance line segments. Similarly, the portions 76 and 78 of the land 38 which extend generally transverse to the phase rotation line 80 (or generally parallel to the axis 70) are located adjacent and on the same side of the segments 82 and 84 of the severance line so that when the die 30 moves in a counterclockwise phase shift (as viewed in FIGS. 1 & 3) they move toward these severance line segments and when the die moves in a clockwise phase shift they move away from these severance line segments.

In a similar manner the portions of the land 40 of the other die 32 can be located on the layout or these portions can simply be located adjacent to and on the opposite side of the segments of the severance line. The portions 86 and 88 of the land 40 which are generally transverse to the axis 70 are located adjacent and on the same side of the segments 72 and 74 of the severance line (which is on the side of these segments opposite the portions 66 and 68 of the land 38) so that when the die 32 moves axially to the left (as viewed in FIGS. 1 & 3) both of these portions of the land move toward these segments of the severance line (and toward their coacting portions 66 and 68 of the other land 38). The portions 90 and 92 of the land 40 which are generally transverse to the phase line 80 are located adjacent to and on the same side of the segments 82 and 84 of the line of severance (and on the side of these segments opposite the portions 76 and 78 of the other land 38) so that when the die 32 shifts counterclockwise in phase (as viewed in FIGS. 1 & 3) these portions of the land move toward these line segments (and the coacting portions 76 and 78 of the other land 38) and when the die 32 shifts clockwise in phase these portions of the land move away from these line segments (and the coacting portions of the other land).

After all of the portions of both of the lands have been located, which edge of each portion will be the cutting edge can be determined. The cutting edge of each land portion is the one edge immediately adjacent the line of severance. With this location and arrangement of the lands and the cutting edge portions, the position of all of the cutting edge portions of the lands 38 and 40 can be adjusted and brought into coacting cutting relationship by moving the dies 30 and 32 axially and in phase relationship relative to each other.

As shown in FIG. 3, the cutting edge 58 of the lands shifts from one side to the other when the lands subtend more than a quadrant. For example, around the perimeter of the land 38 of the lower die the cutting edge shifts or transfers from the outside to the inside of the land when going from the portion 76 to the portion 66 and from the inside to the outside of the land when going from the portion 78 to the portion 68. The cutting edge of the land 40 of the upper die shifts from one side to the other in complimentary or corresponding locations.

Figure 6:
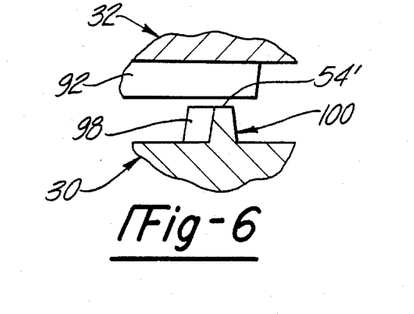
Figure 7:
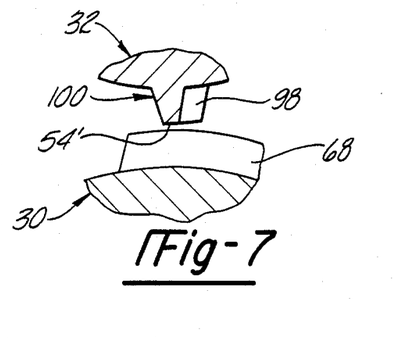

In accordance with another feature of this invention, to prevent crushing and provide a clean cut of the web in the areas where the cutting edges shift from one side to the other of the lands, coacting crossover sections 94 and 96 are formed in each of the lands. When the lands are polygonal the crossover sections are preferably located in diagonally opposed corners of the lands. As shown in FIGS. 3, 6 and 7, the side of each land opposite its cutting edge is relieved which forms a face 98 and a very narrow land section 100 with its outer face portion 54' having a much narrower width than the width of the adjacent portions of the outer face of the land. This relief both prevents the web of material from being crushed between the lands where they cross and provides a clearance or space to receive the severed portions of the web when it is cut in the crossover area.

Usually the width of the upper face 54' of the land 100 in a crossover section is in the range of about 0.0002 to 0.008 of an inch, desirably about 0.0005 to 0.005 of an inch and preferably about 0.001 to 0.002 of an inch. The distance 102 between the front edges of the relief faces 98 is usually in the range of about 0.010 to 0.150 of an inch, desirably about 0.015 to 0.080, frequently about 0.015 to 0.040 and preferably 0.015 to 0.025 of an inch and the distance 104 between the back edges of the relief faces is usually about 0.015 to 0.030 and preferably about 0.018 to 0.022 of an inch greater than the distance 102 even though the included angle between the adjacent portions of the land may be less than 90°.

Figure 8:
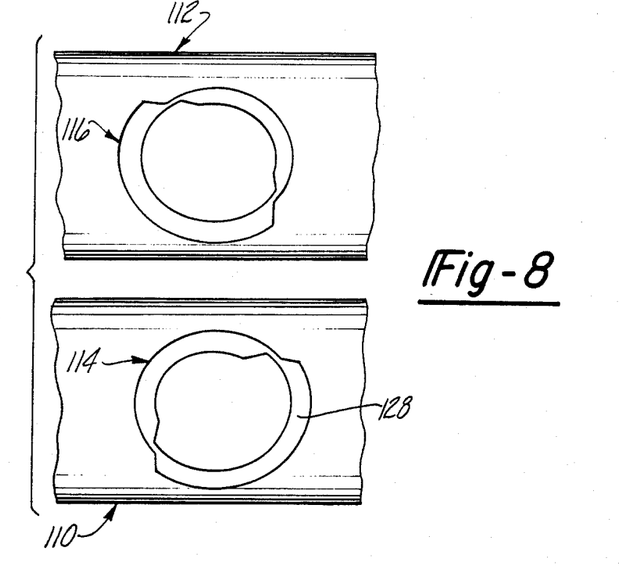
FIG. 8 is a fragmentary side view of another pair of die cylinders embodying this invention having lands thereon arranged to cut circular blanks from a web of material.
Figures 12, 13:
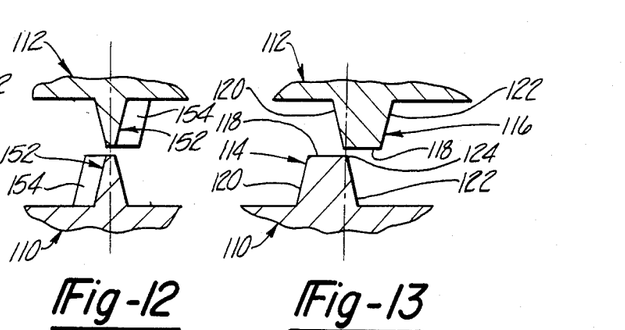
Figure 14:
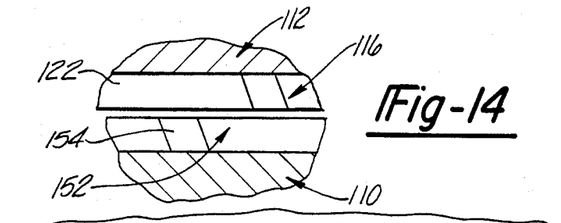

FIG. 8 illustrates another set of lower and upper cylindrical dies 110 and 112 of this invention having lands 114 and 116 constructed and arranged to cut circular blanks or disks from a web of material. The cross sectional geometry and dimensions of the lands 116 and 118 are very similar to those of the lands 38 and 40 of the dies 30 and 32 for cutting rectangular blanks. As shown in FIGS. 12 and 14 each of the lands 114 and 116 has an outer face 118 and side faces 120 and 122. A cutting edge 124 with a positive rake is defined by the outer face 118 in conjunction with one of the side faces 120 or 122 which is inclined at an obtuse included angle to the outer face.

The lands 114 and 116 and the cutting edges 124 are located on the die cylinders so that the relative position of the cutting edges on the die can be varied and adjusted relative to the cutting edges on the other die to provide the desired cutting action by moving axially and in rotary phase the dies relative to each other. For dies cutting circular blanks, this is accomplished in generally the same manner as for dies cutting rectangular blanks.

Figure 9:
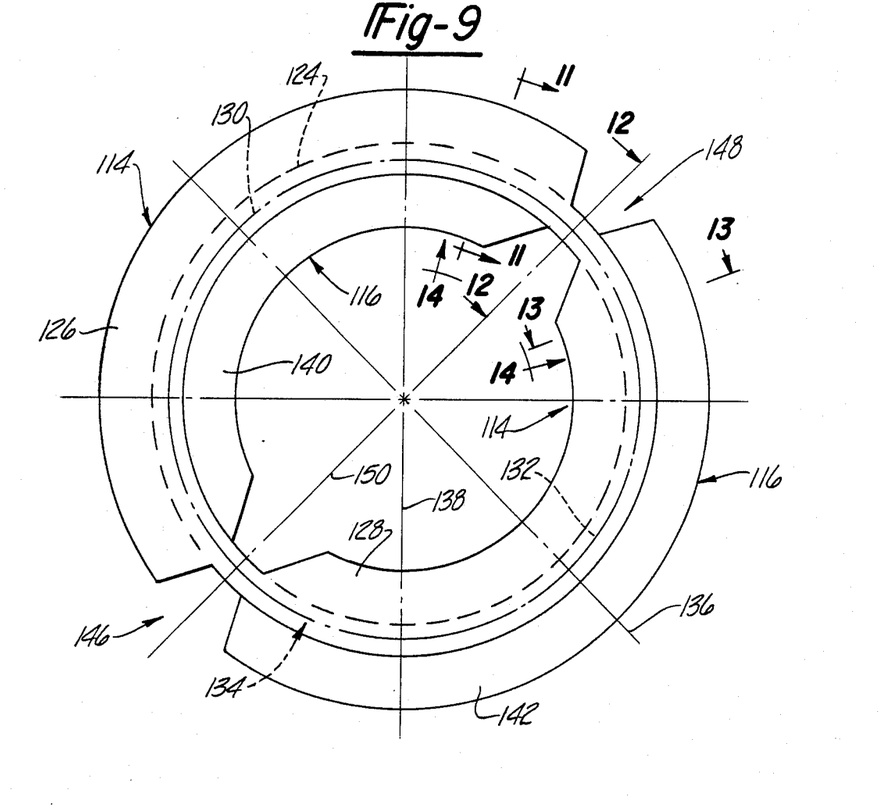
FIG. 9 is an enlarged development and overlay of the lands of the dies of FIG. 9 illustrating the lands disposed in coacting cutting relationship.
Figure 10:
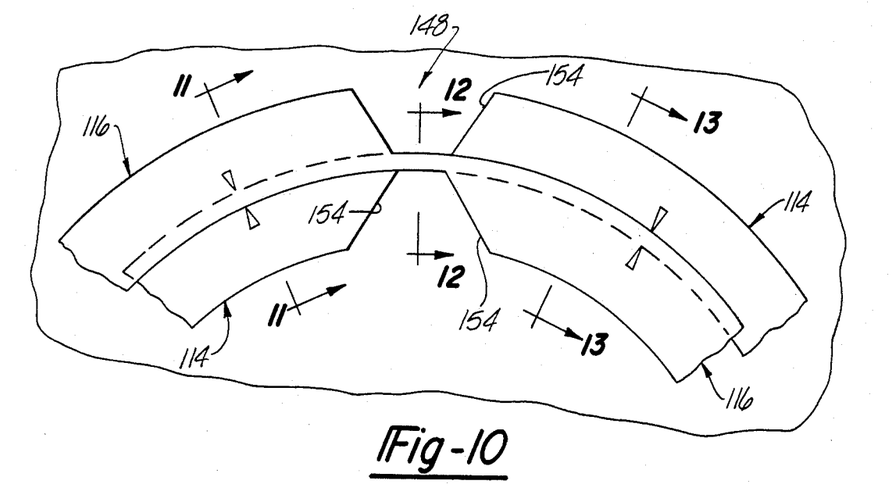
FIG. 10 is an enlarged fragmentary view of a portion of the development and overlay of FIG. 9 illustrating a cross over section in the lands.
Figure 11:
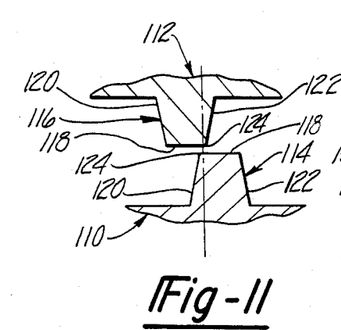
FIGS. 11, 12, 13 and 14 are fragmentary sectional views respectively taken generally on lines 11—11, 12—12, 13—13 and 14—14 of FIGS. 9 and 10.

As shown in the development and overlay of FIG. 9, the land 114 has portions 126 and 128 on opposite sides of the segments 130 and 132 of the desired circular line of severance 134 so that when the lower die 110 moves in one direction along the path 136 this land moves toward and even overlaps these segments of the line of severence and when this die moves in the other direction along this path this land moves away from and even clears these segments. Preferably this path 136 is inclined to the axis of rotation 138 of the die 110 at an acute included angle which is usually about 30° to 60°, desirably about 35° to 55° and preferably 45°. The die 110 is moved along this path 136 in one direction by conjoint axial movement to the right and counterclockwise phase rotation (as viewed from the left side in FIG. 8) and in the other direction by conjoint axial movement to the left and clockwise phase rotation. Similarly, portions 140 and 142 of the land 116 of the upper die 112 are located adjacent to and on opposite sides of the segments 130 and 132 of the severence line 134 so that when the upper die moves in one direction along the path 136 these portions of the land move toward these segments of the line of severence (and the other land of the other die) and when this die moves in the other direction along this path these portions of the land move away from and even clear these segments (and the other land of the other die).

Figure 4:
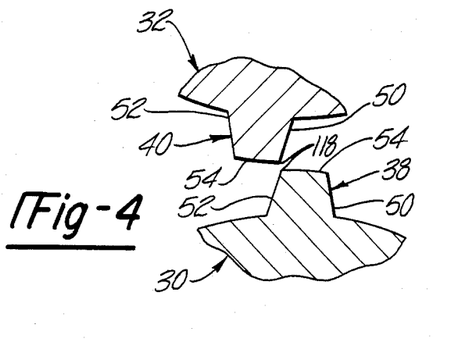
FIGS. 4, 5, 6 and 7 are fragmentary sectional views respectively taken generally on lines 4—4, 5—5, 6—6 and 7—7 of FIG. 3.
Figure 5:
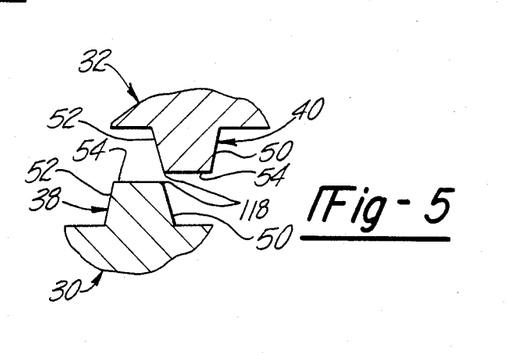

To prevent crushing of the web and provide clearance for the cut portions of the web, each land is relieved adjacent the narrow land portion and the relief faces 154 (FIG. 4) are formed. Usually the narrow land portion 152 has a length which is usually in the range of about 0.010 to 0.150 of an inch, frequently about 0.015 to 0.080, often about 0.015 to 0.040 of an inch and preferably about 0.015 to 0.025 of an inch. Usually the longitudinally distance between the outer edges of the relief faces 154 is about 0.025 to 0.035 and preferably about 0.027 to 0.033 of an inch greater than the length of the narrow land portion.

Usually the lands of dies for cutting circles or disks are designed with a nominal overlap of the cutting edges of about 0.005 of an inch. However, for some web materials the lands may be designed with no overlap and for other web materials with even a clearance between the cutting edges.

The die cylinders can be produced by conventional machining and grinding techniques. However, to provide improved accuracy, greatly increased tool life, and to facilitate forming the desired geometry and configuration of the lands and cutting edges, in accordance with this invention, preferably the die cylinders are made by heat treating, grinding and then electric discharge machining plain cylindrical blanks or workpieces of tool steel. Blank cylinders with a plain cylindrical surface are made of tool steel by machining and then hardened by heat treating. Since heat treating usually distorts and warps the hardened blanks, they are ground to provide a true cylindrical surface with little eccentricity. Thereafter, the hardened and ground blanks are electrical discharge machined to form a die cylinder. A suitable method and apparatus for electrical discharge machining with a flat electrode is disclosed in U.S. Pat. No. 3,542,993. A suitable method and apparatus for electrical discharge machining with a cylindrical electrode is disclosed in U.S. Pat. Nos. 3,550,479 and 3,796,851.

In accordance with another feature of this invention, the outer faces of the lands of the dies can be formed with great accuracy and very little eccentricity. This is achieved by electrical discharge machining the hardened and ground blank cylinder to form the lands without any electric discharge machining of the outer face of the lands. This can be accomplished by electric discharge machining the blank cyclinder with an electrode which does not contact the outer faces of the lands. The cavities of the electrode forming the lands are radially deeper than the radial extent of the lands to be formed so that the outer face of the lands is not engaged by the electrode and hence, not electric discharge machined. Thus, the accuracy of the radius or radial location and the eccentricity of the outer face of the lands is determined by the grinding operation.

Figure 15:
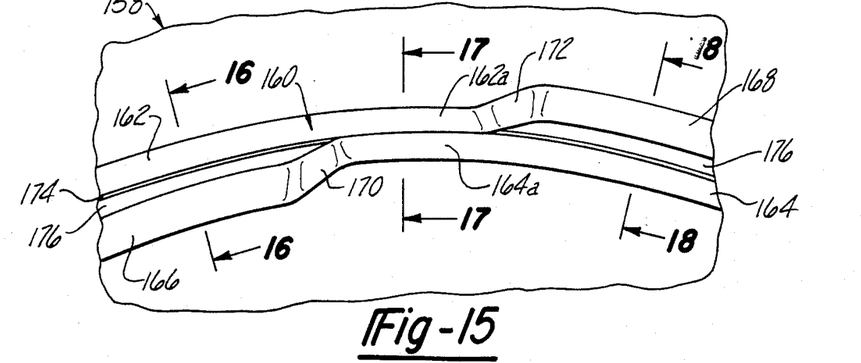
FIG. 15 is a fragmentary plan view of a negative electrode cylinder for electric discharge machining a die cylinder.
Figure 16:
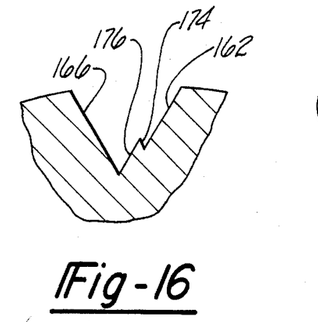
FIGS. 16, 17 and 18 are fragmentary sectional views taken generally on lines 16—16, 17—17 and 18—18 respectively of FIG. 15.
Figure 17:
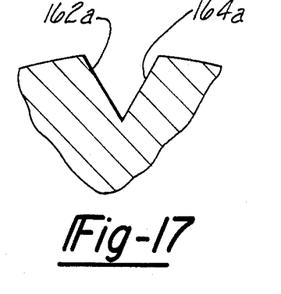
Figure 18:
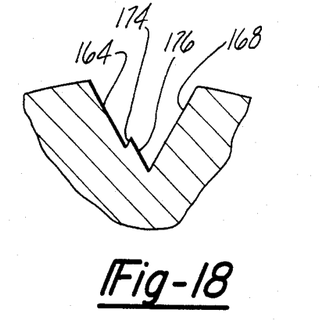
Figure 19:
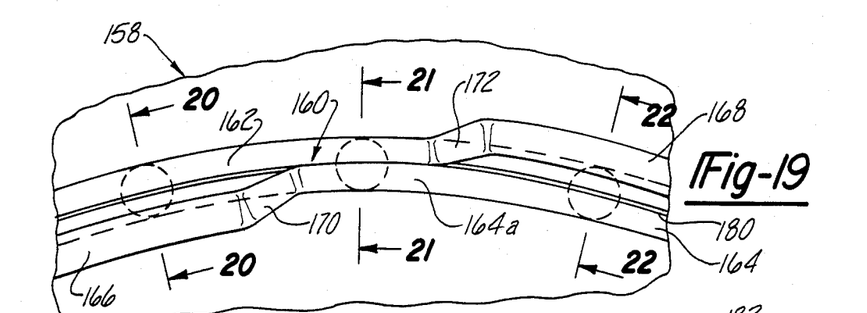
FIG. 19 is a fragmentary plan view of a cavity of the electrode cylinder of FIG. 15 showing various positions of a cutting tool machining the electrode cylinder.

FIG. 15 illustrates a negative electrode cylinder 158 of carbon with a suitable cavity 160 for making the lower die cylinder 110 with the land 114 for cutting a circular blank. To form the side face 120 adjacent the cutting edge 118 of the portion 126 of the land 114, the electrode cavity 160 has a generally circumferentially extending and inclinded surface 162. To form the side face 122 adjacent the cutting edge 118 of the portion 128 of the land, the electrode cavity has a generally circumferentially extending and inclined surface 164. The side faces 154 of the narrow land portions 152 of the crossovers 146 and 148 in the land are also formed by overlapping and generally opposed portions 162a and 164a of these surfaces 162 and 164 which in the crossover areas form a V shaped groove as shown in FIG. 17. These surfaces 162 and 164 each extend to a radial depth slightly greater that the desired radial extent of the land 114. Usually this radial depth exceeds the radial extent of the land by about 0.0005 to 0.010 of an inch, desirably about 0.001 to 0.008 of an inch, and preferably about 0.002 to 0.005 of an inch.

To form the side face 122 distal from the cutting edge of the portion 126 of the land 114, the electrode cavity 162 has a generally circumferentially extending and inclined surface 166. To form the side face 120 distal from the cutting edge of the portion 128 of the land, the electrode cavity has a circumferentially extending and inclined surface 170. These surfaces 168 and 170 each extend to a radial extent of the land 114. As discussed hereinafter, in the preferred method of making this electrode, these surfaces also extend to a greater radial extent than the surfaces 162 and 164.

To provide the relief areas and form the relief faces 154 in the crossover sections 146 and 148 of the land 114, the electrode cavity has canted surfaces 168 and 170. In each crossover area, canted surface 170 interconnects and blends together the surfaces 164 and 166 and the canted surface 170 interconnects and blends together the surfaces 162 and 168.

The surfaces 174 and 176 in the electrode cavity are unnecessary, result from the method by which the cavity is made, and in use of the electrode are not functional and do not electric discharge machine or form any surface of the die cylinder 110.

In accordance with a further feature of this invention, electrodes can be easily, economically, rapidly and accurately produced. They can even be produced with conventional rotary cutting tools and without tools having any special contours or configurations formed thereon. They can be produced using a three axis milling machine and conventional pantograph cutting tools which have relieved conical cutting blades. Preferably the milling machine has a programmable computer numerical control. Milling machines with optical and tracing control systems also could be used.

The three axes for machining a cylindrical electrode can be a first axis, such as the X axis, which is the axis of rotation of the electrode cylinder blank; a second axis, such as the Y axis, which is an arc or circle in a plane perpendicular to the X axis; and a third axis, such as the Z axis, which is a straight line intersecting the X axis at a right angle thereto. The blank electrode cylinder can be mounted for rotation on centers carried by the milling machine table so that its axis extends parallel to the path of reciprocation of the table and intersects the axis of rotation of the tool spindle of the milling machine at a right angle thereto. A suitable servomotor mechanism carried by the machine table can be drivingly connected to the electrode cylinder to rotate it. With this arrangement, relative movement between a cutting tool received in the milling machine spindle and the cylinder blank can be imparted along the X axis by moving the table, along the Y axis by rotating the cylinder blank with the servomotor, and along the Z axis by moving the machine spindle to advance and retract or feed and withdraw the cutting tool.

Figure 20:
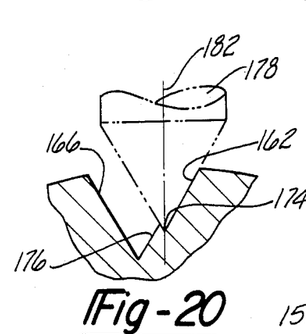
FIGS. 20, 21 and 22 are fragmentary sectional views respectively taken generally on lines 20—20, 21—21 and 22—22 of FIG. 19.
Figure 21:
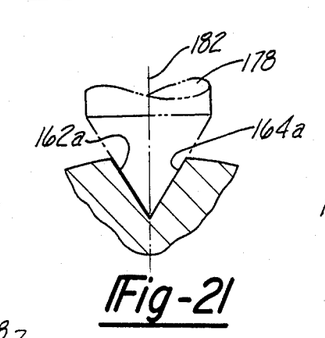
Figure 22:
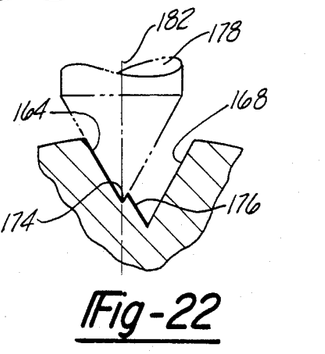

Preferably, the entire electrode cavity for forming one land of a die cylinder is machined in a blank cylinder in only two passes of a rotating cutting tool through the blank. For example, in machining a blank cylinder of carbon to produce the electrode cavity 160, in the first pass of a rotating conical cutter 178 both surfaces 162 and 164 of the electrode cavity can be formed in the electrode blank by machining a V shaped groove therein. The longitudinal path of the apex of this shaped groove parallels or follows the contour of the predetermined desired line of severance. Indeed, if the dies are designed to have a nominal overlap of about 0.004 or 0.005 of an inch the line 180 of the apex of this V shaped groove, and hence the axis of rotation 182 of the cutting tool 178, lies on and follows the desired line of severance. When cutting this V shaped groove, the cutting tool 178 passes through the cylinder blank at a uniform radial depth which is slightly greater than the radial extent of the desired land. When in use, this will produce a slight clearance between the electrode and the outer face of the lands which prevents the outer face from being electric discharge machined. The cutting tool 178 also machines the surface 174 which is unnecessary and non-functional in electric discharge machining the die. The position of the cutting tool 178 in relation to the various surfaces of the finished electrode cavity as it passes through the electrode cavity as shown in FIGS. 20, 21 and 22.

Figure 23:
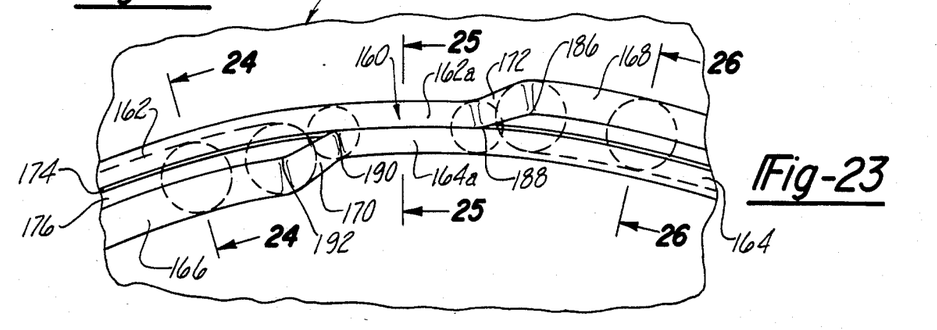
FIG. 23 is a fragmentary plan view of a cavity of the electrode cylinder of FIG. 15 showing various positions of a cutting tool machining the electrode cylinder.
Figure 24:
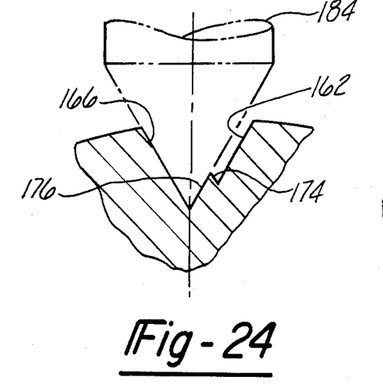
FIGS. 24, 25 and 26 are fragmentary sectional views respectively taken on lines 24—24, 25—25 and 26—26 of FIG. 23.
Figure 25:
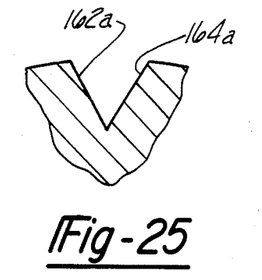
Figure 26:
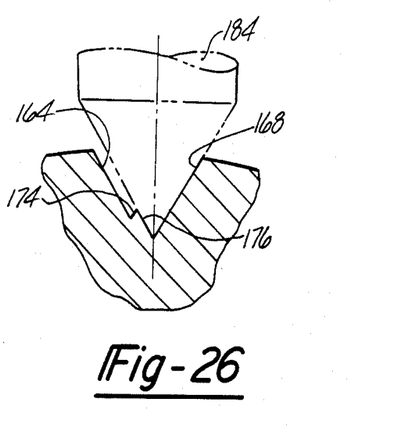

In the second pass of either the same cutter 178 or another rotating conical cutter 184, all of the remaining surfaces of the electrode cavity can be machined if the depth of the cut is varied adjacent the crossover areas. To machine the cavity surface 168, the rotating cutter 184 is fed radially into the cylinder blank as shown in FIG. 26 and then moved along a generally circumferentially extending path at a uniform radial depth until the cutter reaches the position 186 as shown in FIG. 23. To insure that the cutting tool 184 does not cut into the surface 164, preferably it is spaced or offset from this surface at least a few thousandths of an inch. Due to this offset or spacing of the cutting tool, usually it also machines the surface 176 which is unnecessary and non-functional in electric discharge machining the die. This uniform radial depth is slightly greater than the radial extent of the desired land so that when using the electrode, there will be a slight clearance between it and the outer face of the desired land to prevent the outer face from being electric discharge machined. To conveniently machine an electrode cavity which will form a land with an outer face of the desired width, the uniform radial depth of the cutting tool 184 is usually greater than the radial depth of the surface 164.

To machine a relief area adjacent one end of the crossover and the relief surface 172, the rotating cutting tool 184 is moved along a preferably straight line path from the point 186 to a point 188 (FIG. 23) while its depth of feed is decreased by generally radially withdrawing this tool as it transverses this path. At the point 188, this tool is radially withdrawn sufficiently so that it does not cut into the surface portions 162a and 164a as it is moved over the crossover to the point 190 shown in FIG. 23.

To form a relief area adjacent the other end of the crossover and the relief surface 170, the rotating cutting tool 184 is moved along a preferably straight line path from the point 190 to a point 192 (FIG. 23) while its depth of feed is increased by generally radially advancing this tool into the electrode blank as it traverses this path. Preferably, when this cutting tool reaches the point 192 it has just been fed the depth desired for machining the surface 166 in the cavity which depth is preferably equal to the uniform radial depth of the cutting tool when it is machined the surface 168.

To machine the cavity surface 166, the rotating cutting tool 184 is moved from the point 192 along a generally circumferentially extending path at a uniform radial depth until it reaches a point adjacent the other crossover area to be machined in the blank cylinder. To insure that the cutting tool does not cut into the surface 162, preferably it is spaced or offset from this surface at least a few thousandths of an inch. Due to this spacing or offset, the cutting tool also machines the surface 176 which is unnecessary and non-functional in electric discharge machining. This uniform radial depth is at least slightly greater than the radial extent of the desired land so that when using the electrode there will be a slight clearance between it and the outer face of the desired land to prevent the outer face from being electric discharge machined. To conveniently machine an electrode cavity which will form a land with an outer face of the desired width, this uniform radial depth is usually greater than the radial depth of the surface 162.

To machine in the electrode cavity 160, the relief areas and the relief faces for the other crossover 146 for the land 114, the rotating cutting tool 184 goes though a series of movements generally similar to those just described for machining the cavity area for forming the crossover 148 in this land. Since these movements will be apparent in view of those just described for the crossover 146, they will not be stated in detail. In general, to machine the relief area and surface in the cavity adjacent one end of the crossover, this cutting tool is moved along a preferably straight line path while being generally radially withdrawn. Then this tool is radially withdrawn sufficiently so that it does not cut into the surfaces 162a and 164a while this tool is moved to the other end of the crossover. At this other end, this cutting tool is advanced into the electrode blank while it is moved along a preferably straight line path to machine the other relief area and relief surface. Thereafter, if the entire circumferential extent of the surface 168 was not machined initially, it can be finished by moving this cutting tool along a generally circumferential path at a uniform radial depth equal to the radial depth used to machine the initial portion of the surface 168. Preferably, machining of the electrode cavity is initiated at one of the crossovers, such as at the point 190, so that each of the surfaces 166 and 168 will be machined from one end thereof to the other without interruption.

A die cavity can also be machined in a flat electrode blank with only two passes of a rotating cutting tool through the blank. These two passes will be essentially the same as those just described for machining the cavity 160 in a cylinder blank. However, the steps of these two passes will not be repeated for a flat blank.

Thus, by this relatively simple sequence of machining operations with readily available conical cutting tools, a negative electrode can be accurately, simply, economically and reliably produced for electrical discharge machining a cylindrical work piece to produce a rotary cutting die. Since both of the surfaces 162 and 164 are machined by the same cutting tool at the same time, they can be located with great accuracy. Moreover, since the cutting edges are formed only by the intersection of the ground outer face of the die cylinder and one of the side faces produced by these surfaces, the cutting edges are formed and located with great accuracy. The remaining surfaces in the cavity 160 of the electrode are also accurately formed by a single cutting tool which accurately locates the relief areas and relief faces.

Figure 27:
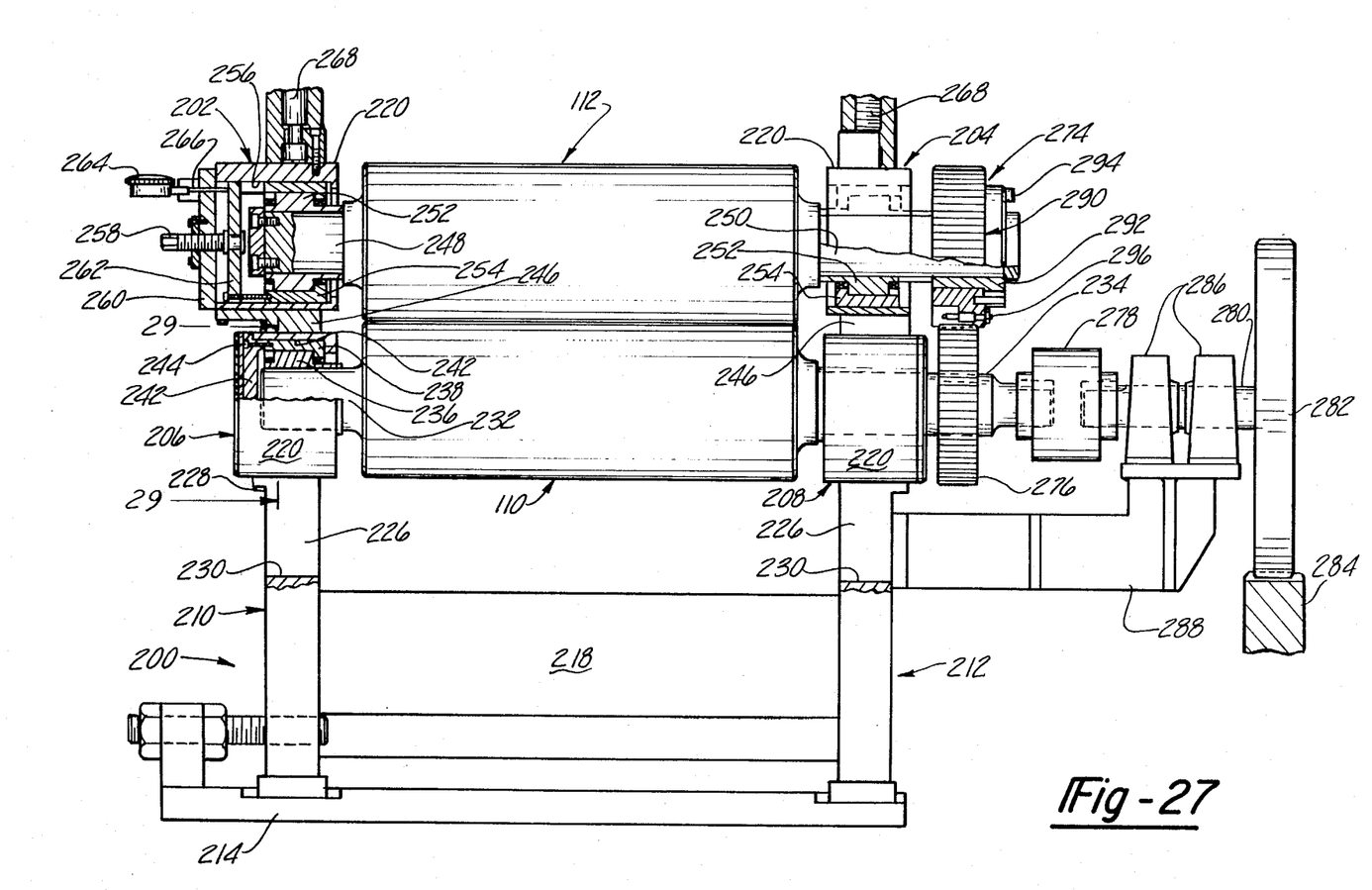
FIG. 27 is a fragmentary side view with portions broken away and in section of a die stand for positioning and driving the rotary cutting dies.
Figures 28, 29:
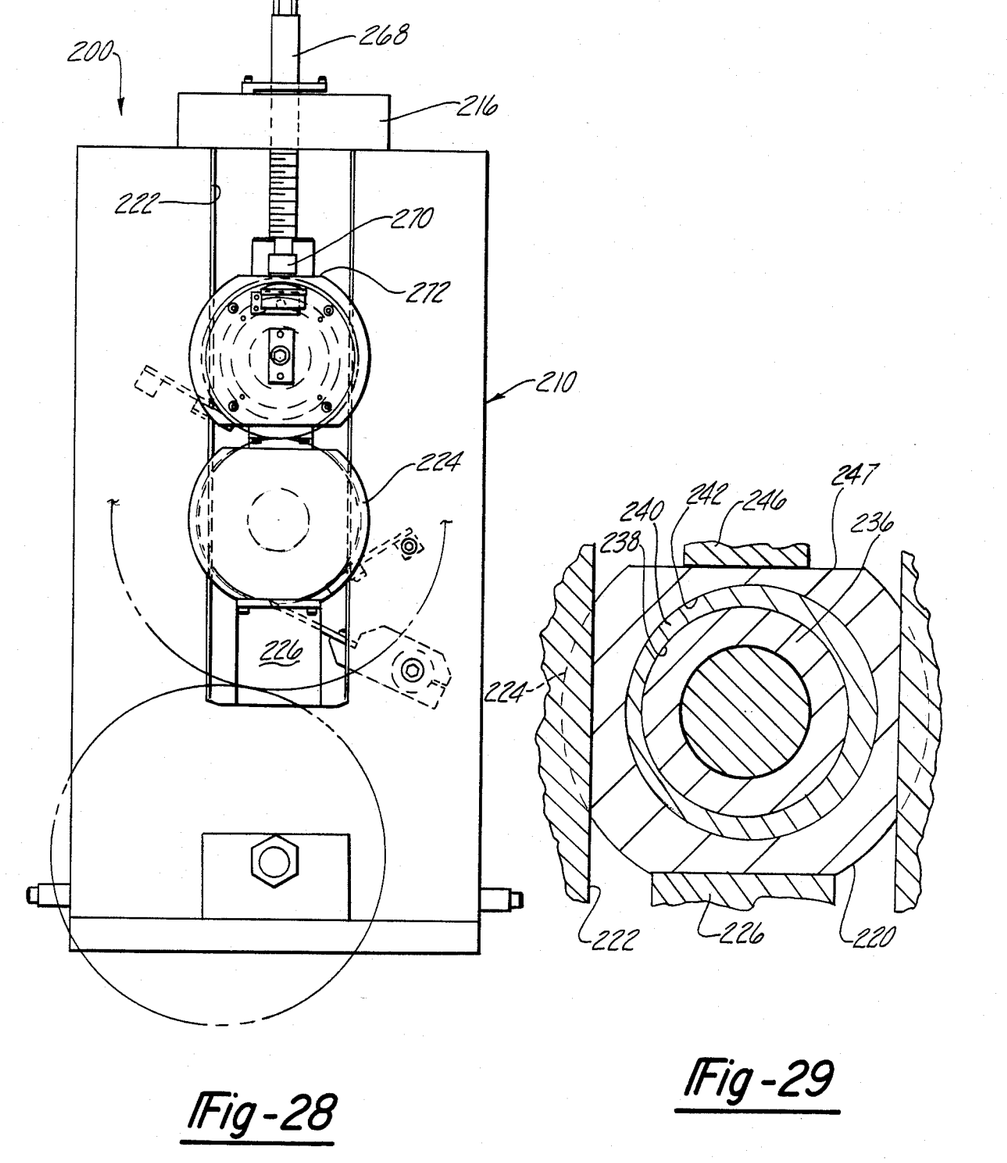
FIG. 28 is an end view of the die stand of FIG. 27.
FIG. 29 is a fragmentary sectional view taken generally on line 29—29 of FIG. 27.

In accordance with another feature of this invention, the die cylinders are received in a die stand which accurately positions them in operative relationship and permits them to be readily adjusted axially, in phase relationship, for clearance between the dies and skewing of the axes of the dies. FIGS. 27 and 28 illustrate a die stand 200 having a pair of rotary die cutting die cylinders such as the dies 110 and 112 received therein. The upper die 112 is journaled for rotation in a pair of bearing assemblies 202 and 204 and the lower die 110 is journaled for rotation in a pair of bearing assemblies 206 and 208. The bearing assemblies are carried by up standing supports 210 and 212 secured to a base plate 214. The supports 210 and 212 are secured together by upper and lower tie plates 216 and 218.

The bearing assemblies 206 and 208 for the lower die each have a housing 220 each slideably received in a slot 222 in the supports 210 and 212. Each housing 222 has a pair of spaced apart flanges 224 retaining the housing in the slots. Each housing rests on support blocks 226 which is secured to the housing by cap screws 228 and bears on the bottom 230 of the slot 222 in its supports. The lower die 110 has a pair of integral stub shafts 232 and 234 each of which is journaled for rotation in a bearing 236 received in one of the bearing blocks.

To enable the axis of the lower die 110 to be skewed relative to the axis of the upper die 112, the bearings 236 of the lower die are mounted in bores 238 of rotatable sleeves 240. The bores 238 are eccentric with respect to the axis of rotation of the lower die. Each sleeve 240 is journaled in a bore 242 in the housing 220 so that it can be rotated relative to the housing to skew the axis of the lower die. A cover plate 242 is secured by cap screws 244 to each sleeve 238 so that it can be rotated by turning the cover plate. The cover plate is releasably secured to the housing by cap screws (not shown) to prevent it from moving after it has been rotated to the desired position.

Each bearing assembly 202 and 204 for the upper die 112 is also received in a housing 220 slideably received in the slot 222 in its associates support 210 or 212 and retained therein by the flanges 224. To permit adjustment of the clearance between the die cylinders, the upper bearing assemblies rest on a pair of spacer blocks 246 which are secured to their housings and bear on flat faces 247 on the bearing housings for the lower die. The clearance between the die cylinders can be varied by inserting or removing shims from under the spacer blocks or by changing the height of the spacer blocks.

The upper die 112 has a pair of integral stub shafts 248 and 250 each of which is journaled in a bearing 252 which is mounted in a sleeve 254. To enable axial movement of the upper die 112 relative to the lower die, the sleeves 254 are slideably received in bores 256 in the housings. The upper die 112 and the sleeves 254 are moved relative to the lower die by turning a stud 258 which is threadedly engaged with a cover plate 260 and captured in carrier plate 262 secured by cap screws to the left-hand sleeve for movement therewith. To provide an indication of the axial location of the upper die, a dial indicator 264 is mounted on the cover plate with its plunger 266 bearing on the carrier plate.

To firmly clamp and secure the bearing assemblies in the slots 222 of their supports, a pair of screws 268 are threaded through the tie bar 216 and having a head 270 which can be forced into firm engagement with a flat face 272 of the upper bearing housings to thereby secure all the bearing housings in the slots in the supports. The heads are loosely received in a retainer block 273 secured to the bearing housings.

To be sure that the upper and lower die cylinders are driven in corotation in opposite directions of rotation at the same surface speed, a pair of meshed gears 274 and 276 are secured to the shafts 250 and 234 of the dies. To drive the dies, the shaft 234 of the lower die is connected by an angular velocity coupling 278 to a drive shaft 280 driven by meshed gears 282 and 284. The drive shaft 280 is journaled for rotation in a pair of bearings 286 secured to a support bracket 288 fixed to the upright 212.

In accordance with a further feature of this invention, the rotary phase relationship of the upper and lower dies to each other can be varied and adjusted. To permit this adjustment, the gear 274 has a gear ring 290 journaled on a hub 292 secured to the shaft 250. The gear ring 290 can be releasably secured to the hub in any desired angular position by cap screws 294. To eliminate back lash between the gears 274 and 276, the gear ring 290 is circumferentially split into two sections one of which can be rotatably shifted with respect to the other and releasably secured by the lock mechanism 296 to ensure continuous engagement of the meshed gears and thereby eliminate all back lash.

To use the rotary cutting dies 30, 32 or 110, 112 they can be mounted in the die stand 200 and driven by a suitable prime mover (not shown) such as an electric motor. Samples of web material can then be fed between the rotating dies to determine if the cutting edges are properly coacting to produce a clean cut. If they are not, the amount of clearance between the dies and their axial, skew and phase relationships can be adjusted until they produce a clean cut.

Their axial relationship can be adjusted by turning the threaded stud 258. The extent of the axial adjustment can be determined by observing the dial indicator 264. The rotary phase relationship can be adjusted by releasing, turning and resecuring the gear ring 290 relative to its hub 292 of the gear 274 driving the upper die. The skew relationship of the axes of the dies can be adjusted by releasing, turning and resecuring one or both of the covers 242 of the bearing assemblies for the lower die to rotate the eccentric sleeved 236 in their housings.

Figure 30:
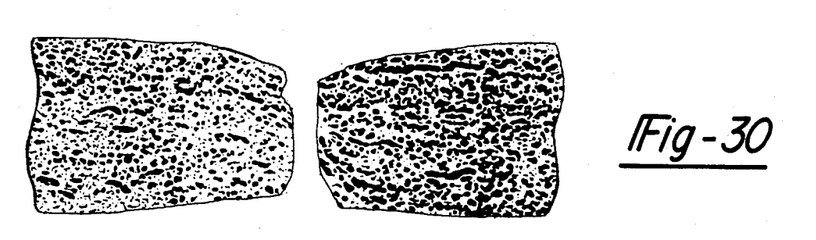
FIG. 30 is a fragmentary sectional view of a web of material cut by a pair of rotary cylindrical dies embodying this invention.
Figure 31:
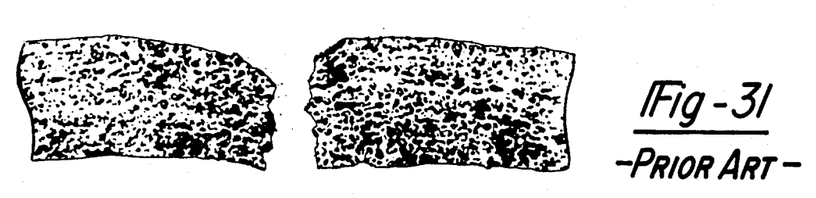
FIG. 31 is a fragmentary sectional view of a web of material cut by a prior art rotary die and anvil.
Figure 32:
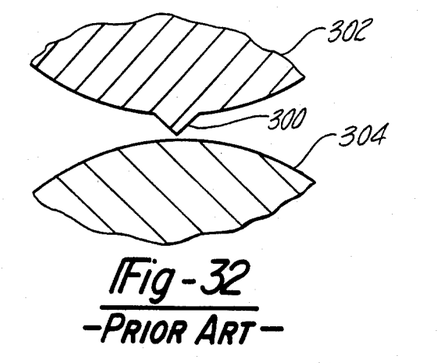
FIG. 32 is a fragmentary sectional view of a prior art rotary cutting die and anvil.
Figure 33:
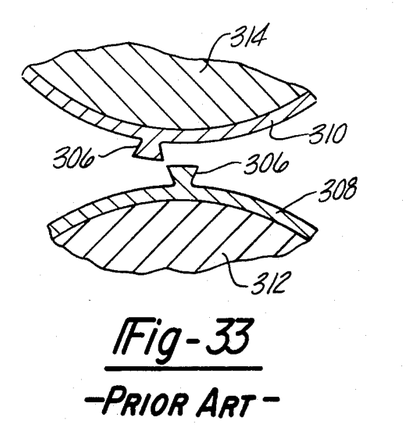
FIG. 33 is a fragmentary sectional view of a prior art pair of rotary cutting dies.

In use, the rotary cutting dies of this invention make a much cleaner and smoother cut in a web of material, such as paper board, than the cuts produced by prior art devices. Moreover, the cut ends of the web material has a far greater squareness than the ends of webs cut by the prior art devices. This improved cut and squareness is clearly shown by a comparison of FIGS. 30 and 31. FIG. 30 is an enlarged photographic view of the end portion of a piece of paper board cut by the rotary dies of this invention. FIG. 31 is an enlarged photographic view of the ends of the same paper board cut by prior art rotary dies shown in FIG. 32 having a cutting blade 300 on one rotary die 302 and a plain cylinder 304 providing an anvil. Another prior art pair of rotary dies are illustrated in FIG. 33 which have negative rake cutting edges 306 integral with thin metal plates 308 and 310 secured to upper and lower plain cylinders 312 and 314 by an adhesive or mechanically. The cutting edges 306 are formed by applying to the thin metal plates photocomposed images of the cutting elements in the form of an acid resist and then chemically etching away portions of the remaining surface on the plates so that the cutting elements stand out in a shallow relief. The negative rake of these cutting edges 306 results in a cut of poor quality and greatly increases the likelihood the cut blanks will hang up in the dies.

The improved cut and squareness produced by the dies of this invention is believed to be due to the geometry and configuration of their cutting elements or lands. The positive rake of the side face associated with the cutting edge in conjunction with the width of the lands and the arcuate movement of these elements relative to the web is believed to provide this improved cut and squareness by compressing the web of material while it is being cut and by forcing the cut end into engagement with and wiping it across the positively raked side faces associated with the cutting edges. Regardless of whether this theoretical explanation is correct, the rotary dies of this invention unexpectedly do provide greatly improved results in cleanly cutting the web, squareness of the cut ends, and a greatly decreased tendency for the cut blanks to hang up in the dies. Moreover, unexpectedly, they can cleanly cut materials which could not be cut satisfactory by prior art rotary dies.

We claim:

1. Cylindrical dies which when rotating cut a web of material along a predetermined line of severance which subtends more than a quadrant which comprises: a pair of coating die cylinders of metal constructed and arranged to be journaled for rotation, at least one pair of coacting elongate severing blades with each blade of said pair disposed on one of said die cylinders, each severing blade comprising an elongate land projecting generally radially outwardly from the main body of its associated die cylinder, each said elongate land having an outer face and spaced apart and generally depending side faces defining a pair of spaced apart edges, said outer face having a width between said spaced apart edges of at least 0.010 of an inch, at least the portion of said side faces adjacent said outer face of each land of each severing blade being inclined toward each other at an acute included angle and each inclined to its associated outer face at an obtuse included angle, said coactng severing blades of each pair being constructed, arranged and positioned on their respective die cylinders such that during corotation of said pair of die cylinders the immediately adjacent edges of said coacting severing blades of each pair cut the web therebetween along a predetermined line of severance while the other edges of said coacting severing blades are on generally opposite sides of such line of severance, and at least one pair of coacting crossover sections each in one blade of said pair of severing blades, each said crossover section having a narrow segment of said outer face with a maximum width of less than one-fourth of the maximum width of adjacent portions of said outer face of its land, said narrow segment of said outer face lying immediately adjacent the line of severance and extending at least to the point where the cutting action of said coacting severing blades transfers over from one edge to the other edge of said lands of said severing blades, whereby a pair of die cylinders can be shifted generally axially with respect to each other and/or shifted in rotational phase relationship with respect to each other such that an appropriate relationship between all of the severing blades thereof can be maintained for cutting the web along the predetermined line of severance.

2. The cylindrical dies of claim 1 wherein said acute included angle between said side faces of each land is in the range of about 25 to 50 degrees.

3. The cylindrical dies of claim 1 wherein said acute included angle between said side faces of each land is in the range of about 25 to 45 degrees.

4. The cylindrical dies of claim 1 wherein said obtuse included angle between a side face and its associate outer face of each land is in the range of about 100 to 120 degrees.

5. The cylindrical dies of claim 1 wherein the width of the outer face of each of said lands is in the range of about 0.02 to 0.06 of an inch.

6. The cylindrical dies of claim 1 wherein the width of the outer face of each of said lands is in the range of about 0.025 to 0.045 of an inch.

7. The cylindrical dies of claim 1 wherein the outer face of each of said lands is disposed generally radially outwardly of the main body of its associated die cylinder in the range of about 0.050 to 0.125 of an inch.

8. The cylindrical dies of claim 1 wherein the outer face of each of said lands is disposed generally radially outwardly of the main body of its associated cylinder in the range of about 0.060 to 0.080 of an inch.

9. The cylindrical dies of claim 1 wherein adjacent at least one end of said narrow outer face in each crossover section the side face of said land distal from the line of severance is relieved, whereby clearance is provided for the web.

10. The cylindrical dies of claim 1 wherein adjacent at least one end of said narrow outer face in each crossover section the side face of said land distal from the line of severance is relieved, whereby clearance is provided for the web.

11. The cylindrical dies of claim 1 which also comprises a carrier housing, a first set of bearings carried by said housing and journaling for rotation one of said die cylinders, a second set of bearings carried by said housing and journaling for rotation the other of said die cylinders with said die cylinders disposed in opposed generally face-to-face relation with their longitudinal axes of rotation extending generally parallel to each other such that the web can pass between the die cylinders, one of said sets of bearings being constructed and arrangned such that its associated die cylinder can be shifted generally axially with respect to the other die cylinder.

12. The cylindrical dies of claim 11 which also comprises a pair of spaced apart sleeves each having therein one bearing of said one bearing set and being slidably carried by said housing such that said one die cylinder can be shifted generally axially to the other die cylinder by slidably moving said sleeves with respect to said housing.

13. The cylindrical dies of claim 11 which also comprises a pair of spaced apart sleeves each having one of the bearings of one of said sets of bearings mounted therein, each of said sleeves having an outer cylindrical face which is eccentric with respect to the axis of rotation of the die cylinder journaled in the bearing mounted in said sleeves, and each of said sleeves being carried by said housing such that rotation of said sleeves with respect to said housing will skew the axis of rotation of the die cylinder carried by said sleeves with respect to the axis of rotation of the other die cylinder.

14. The cylindrical dies of claim 11 which also comprises a pair of spaced apart slides carried by said housing for movement along paths generally perpendicular to and intersecting both of the axes of rotation of both of said die cylinders, each of said sleeves being carried by one of said slides such that the extent of the clearance between said pair of die cylinders can be varied and controlled by moving said slides with respect to said housing.

15. The cylindrical dies of claim 11 which also comprises a pair of meshed gears having the same pitch diameter, each said gear being constructed and arranged to be coupled with one of the die cylinders journaled by said first and second bearing sets for rotation of the die cylinders in opposite directions of rotation and adjustment means associated with one of said gears for varying its angular relationship with the die to which it is coupled such that the phase rotational relationship of the die cylinders can be varied and adjusted.

16. Cylindrical dies which when rotating cut along a predetermined line of severance in a web of material which comprise: a pair of coacting dies cylinders of metal constructed and arranged to be journaled for rotation, at least one pair of coacting elongate severing blades with each blade of said pair disposed on one of said die cylinders, each severing blade comprising an elongate land projecting generally radially outwardly from the main body of its associated die cylinder, each said elongate land having an outer face and spaced apart and generally depending side faces defining a pair of spaced apart edges, said outer face having a width between said spaced apart edges of at least 0.010 of an inch, at least the portion of said side faces adjacent said outer face of each land of each severing blade being inclined toward each other at an acute included angle and each inclined to its associated outer face at an obtuse included angle, and said coacting severing blades of each pair being constructed, arranged and positioned on their respective die cylinders such that during corotation of said pair of die cylinders the immediately adjacent edges of said coacting severing blades of each pair cut the web therebetween along a predetermined line of severance while the other edges of said coacting severing blades are on generally opposite sides of such line of severance, the line of severance in the web being a closed figure, and at least two pair of coacting crossovers each in one of said lands of said pair of severing blades, each said crossover section having a narrow segment of said outer face with a maximum width of less than one-fourth of the maximum width of adjacent portions of said outer face of its land, said narrow segment of said outer face lying immediately adjacent the line of severance and extending at least to the point where the cutting action of said coacting severing blades transfers over from one edge to the other edge of said lands of said severing blades, whereby a pair of die cylinders can be shifted generally axially with respect to each other and/or shifted in rotational phase relationship with respect to each other such that an appropriate relationship between all of the severing blades thereof can be maintained for cutting the web along the predetermined line of severance.

17. The cylindrical dies of claim 16 wherein adjacent at least one end of said narrow outer face in each crossover section the side face of said land distal from the line of severance is relieved, whereby clearance is provided for the web.

18. The cylindrical dies of claim 16 wherein said pair of severing blades in a generally polygonal configuration as developed in the flat and the two crossover sections in each severing blade of said pair are in generally diagonally opposed relationship thereto.

19. The cylindrical dies of claim 16 wherein each of said severing blades of said pair thereof is generally circular as developed in the flat and the two crossover sections in each severing blade of the pair are located in generally diametrically opposed relation and on opposite sides of the axis of rotation of their associated die cylinder.

20. The cylindrical dies of claim 19 wherein the acute included angle between a straight line through the two crossover sections in such diametrically opposed relation and such axis of rotation is in the range of about 35 to 55 degrees on a layout of the outer face of the severing blades as developed in the flat.

21. The cylindrical dies of claim 1 which also comprises a carrier housing, a first set of bearings carried by said housing and journaling for rotation one of said die cylinders, a second set of bearings carried by said housing and journaling for rotation the other of said die cylinders with said die cylinders disposed in opposed generally face-to-face relation with their longitudinal axes of rotation extending generally parallel to each other such that the web can pass between the die cylinders, one of said sets of bearings being constructed and arranged such that its associated die cylinder can be shifted generally axially with respect to the other die cylinder.

22. The cylindrical dies of claim 21 which also comprises a pair of spaced apart sleeves each having therein one bearing of said one bearing set and being slidably carried by said housing such that said one die cylindrical can be shifted generally axially to the other die cylinder by slidably moving said sleeves with respect to said housing.

23. The cylindrical dies of claim 21 which also comprises a pair of spaced apart sleeves each having one of the bearings of one of said sets of bearings mounted therein, each of said sleeves having an outer cylindrical face which is eccentric with respect to the axis of rotation of the die cylinder journaled in the bearing mounted in said sleeves, and each of said sleeves being carried by said housing such that rotation of said sleeves with respect to said housing will skew the axis of rotation of the die cylinder carried by said sleeves with respect to the axis of rotation of the other die cylinder.

24. The cylindrical dies of claim 21 which also comprises a pair of spaced apart slides carried by said housing for movement along paths generally perpendicular to and intersecting both of the axis of rotation of both of said die cylinders, each of said sleeves being carried by one of said slides such that the extent of the clearance between said pair of die cylinders can be varied and controlled by moving said slides with respect to said housing.

25. The cylindrical dies of claim 21 which also comprises a pair of meshed gears having the same pitch diameter, each said gear being constructed and arranged to be coupled with one of the die cylinders journaled by said first and second bearing sets for rotation of the die cylinders in opposite directions of rotation and adjustment means associated with one of said gears for varying its angular relationship with the die to which it is coupled such that the phase rotational relationship of the die cylinders can be varied and adjusted.

26. The cylindrical dies of claim 16 wherein said acute included angle between said side faces of each land is in the range of about 25 to 50 degrees.

27. The cylindrical dies of claim 16 wherein said acute included angle between said side faces of each land is in the range of about 25 to 45 degrees.

28. The cylindrical dies of claim 16 wherein said obtuse included angle between a side face and its associate outer face of each land is in the range of about 100 to 120 degrees.

29. The cylindrical dies of claim 16 wherein the width of the outer face of each of said lands is in the range of about 0.02 to 0.06 of an inch.

30. The cylindrical dies of claim 16 wherein the width of the outer face of each of said lands is in the range of about 0.025 to 0.045 of an inch.

31. The cylindrical dies of claim 16 wherein the outer face of each of said lands is disposed generally radially outwardly of the main body of its associated die cylinder in the range of about 0.050 to 0.125 of an inch.

32. The cylindrical dies of claim 16 wherein the outer face of each of said lands is disposed generally radially outwardly of the main body of its associated cylinder in the range of about 0.060 to 0.080 of an inch.

* * * * *